Figure 1:
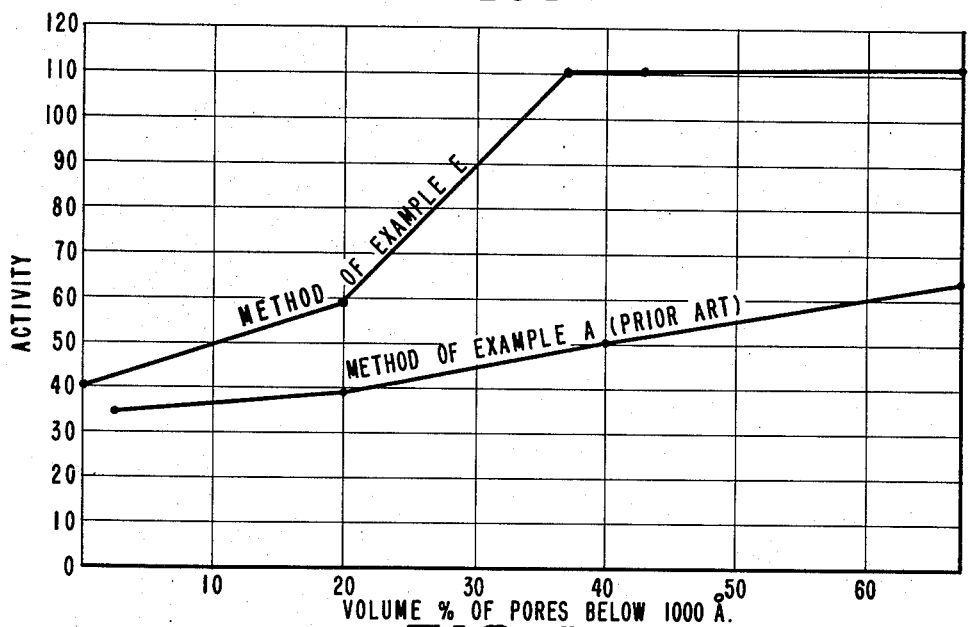

Dec. 15, 1964　　　J. H. BECK ETAL　　　3,161,605
PREPARATION OF SUPPORTED CATALYSTS
Filed March 31, 1961

INVENTORS
JOHN HUBERT BECK
ALVIN BARBER STILES

BY　*A. McAlevy*
ATTORNEY

United States Patent Office 3,161,605
Patented Dec. 15, 1964

3,161,605
PREPARATION OF SUPPORTED CATALYSTS
John Hubert Beck and Alvin Barber Stiles, Charleston, W. Va., assignors to E. I. du Pont de Nemours and Company, Wilmington, Del., a corporation of Delaware
Filed Mar. 31, 1961, Ser. No. 99,748
6 Claims. (Cl. 252—455)

This invention relates to a process for preparing catalysts comprising a precious metal, more particularly a member of the class consisting of platinum, palladium, ruthenium, silver, and rhodium, on a support such as silica-alumina, or the like, especially supports having at least 1% (by volume) of the pores less than 200 A. in diameter and at least 10% less than 1000 A. in diameter. The catalysts obtained by the process of this invention are characterized by improved resistance to deactivation at the very high temperatures encountered in fume abatement units wherein nitrogen oxides are reacted with hydrogen, alkanes, olefins, or other reducing gases. They also have unusually high activity and life in other catalytic processes.

Catalysts having precious metal supported on silica-gamma alumimna as well as other supports have been known heretofore. In fume abatement processes of the kind hereinabove mentioned it is important that the catalyst have a low light-off temperature (e.g. 25° C.), since in many instances the gases which are subjected to the fume abatement treatment may be at ambient temperature; but the catalyst must also have exceptionally high resistance to deactivation at the maximum temperatures reached in such units (usually 600° C. to 800° C., but occasionally as high as 1200° C., or higher). The prior art catalysts did not consistently meet these requirements. For example, catalysts having the precious metal fairly uniformly distributed throughout the mass of the catalyst granule or particle, have a relatively high minimum light-off temperature. The same is true of catalysts of low surface area. On the other hand, catalysts which are initially very active but which tend to lose high surface area at very high temperature (e.g. by transition from the gamma form to the alpha form of the alumina support) are deficient in respect to sustained activity under conditions of use.

An object of this invention is to provide catalysts of the general type hereinabove described, but which are free from the said deficiencies.

This object is accomplished, according to this invention by a process which comprises the following steps: (1) bringing a support having at least 1% by volume of its pores less than 200 A. diameter and 10% less than 1000 A. in diameter, into contact with an aqueous solution of an ionizable salt of at least one element of the class consisting of platinum, silver, ruthenium, palladium, and rhodium, whereby about 0.1% to 5.0% by weight of said element is incorporated in the said support; (2) subjecting the resulting undried solid to the action of hydrogen (or other reducing gas, as described below) at controlled humidity at a temperature initially below 100° C., and preferably from 0° C. to 75° C., said humidity being from 15% to 90% R.H. under the prevailing conditions, whereby the said element or elements are reduced to metal or metals while said ionizable salt is leaching to the surface of the solid, the reduction to metal taking place at a rate which is not more rapid than the rate of migration thereof to the surface, yet not so slow as to cause accumulation of sufficient unreduced salt at the surface to form a metal coating which can be sloughed off by abrasion; and continuing the reduction until all of the said element or elements are in the form of metal. In general, a final heating to a temperature above 100° C. (suitably 100° C. to 1000° C. but below the sintering temperature of the support) is desirable, in particular applications.

A characteristic property of the catalysts obtained by this method is the absence of any substantial quantity of metal coating in a form such that it can be easily sloughed off by simple abrasion, e.g. by rubbing the catalyst between the hands. This simple test is useful in establishing the fact that humidity is not too low, nor the rate of reduction too slow, to balance properly the rate of migration of metal ions to the surface with the rate of reduction. Thus, by keeping the humidity at the appropriate level, in the range hereinabove specified, it is possible to control the character of the metal coating on the catalyst particle.

In general, the catalyst granules prepared by the method of this invention can be examined visually, very effectively, by mounting the granules in methyl methacrylate monomer, polymerizing the monomer in the conventional way, and cutting through the resulting embedment so that some of the granules are sliced through, producing sections which permit close examination of the catalyst structure. Examination in this manner shows that the granules are free of metal in the interior, and have a metal coating which is a permeable layer, the pores of the support in the immediate proximity of the surface being penetrated to a discernible, but very slight, extent by the metal, these inwardly projecting portions of the apparently contiguous, yet permeable, coating, serving to hold the coating more firmly to the surface of the support. In contrast with this, a catalyst for the fume abatement purposes hereinabove described, when made by conventional methods heretofore known, has at least some of the metal well within the interior of the granule, and this can be readily observed by employing the visual examination technique just described.

The submicroscopic structure of the metal coating formed by the process of this invention, as determined by X-ray examination, is that of crystallites having a maximum dimension of less than 50 A. If reduction is performed at low temperature, e.g. 0° C. to 75° C. the crystallite size is at a minimum and this is highly advantageous. On the other hand, when the reduction is performed at a temperature which is too high, the crystallite size is too large, and the catalyst activity is correspondingly low (i.e. clean-up is incomplete and light-off temperature is too high). This is especially noticeable when the crystallite size exceeds 200 A.

While in the silica-alumina catalyst supports the silica is, in general, co-precipitated with the alumina, there are other known methods for preparing intimate mixtures of silica and alumina. For example, hydrous colloidal silica may be precipitated by addition of nitric acid to a solution of sodium meta silicate and the resulting mixture can be added to an aqueous dispersion of precipitated aluminum hydroxide similarly made by adding aqueous ammonia to aqueous aluminum sulfate. In any event, the silica becomes very intimately admixed with the alumina precipitate, and the alumina in resulting mixture is converted to gamma alumina by washing and drying techniques which are well known in the art.

While the silica-alumina support just described is outstandingly effective in carrying out the process of the invention, it is to be understood that the broad principle can be employed with other supports having similar properties. Thus, in its broadest aspect, the invention comprises a catalyst method and product, characterized by the coating of a porous support with a catalytically active metal, said metal being present as a permeable surface layer which is not easily removable by abrasion from said support, said support being a material which does not undergo physical transition when heated in an inert atmosphere to temperatures as high at 1200° C. As in the case of silica-alumina, these other supports should have the desirable pore characteristics, i.e., they should have pore dimensions of at least 1 volume percent less than 200 A. and at least 10 volume percent less than 1000 A. in diameter. The chemical characteristics of the support should be compatible with the reaction conditions; e.g., one could not use carbon in most oxidation reactions.

The expression "not removable" by abrasion from said support refers to the inability to separate metal from support by ordinary abrasion, such as that encountered in normal usage. In prior art catalysts, even when metal coatings are present, the metal can be sloughed off as discrete particles of metal. In this respect the catalysts of the present invention differ from those of the earlier art. The expression "physical transition" refers to a change in crystalline form, or a change in phase, or other deep-seated physical change attended by a substantial change in physical dimensions.

The metals which may be deposited upon the support as above described include combinations of any of the five metals disclosed above, namely platinum, palladium, ruthenium, silver and rhodium. In the use of these catalysts the transient oxide which is apparently formed as an intermediate is more volatile than the metal itself. Loss of precious metal by volatilization of oxide can be suppressed by employing a mixture of rhodium and platinum or palladium in the form of the salts. The salts which may be used are those which are employed in conventional catalyst preparations, such as the chloride, nitrate, etc. In many instances the aqueous salt can be applied by dipping the support in the solution and permitting the solid to drain. The quantity of metal is controlled very simply by controlling the concentration and quantity of solution which is permitted to soak into the support.

The invention is illustrated further by means of the following examples.

EXAMPLE A

*Control Run Preparation of Catalyst by Previously Known Liquid Phase Reduction Process*

A high surface area gamma alumina in the form of spheres (containing 6% of intimately admixed silica) of the type manufactured by the Aluminum Company of America and designated as H–151, was heated to 200° C. for two hours in a flow of air to remove adsorbed moisture. The heated spheres, ⅛ inch in diameter, were cooled in such a way as to prevent moisture readsorption. An aqueous solution of rhodium and platinum chlorides was made up such that the solution contained 0.1 weight percent rhodium and 0.4 weight percent platinum. A sufficient quantity of this solution was weighed into a 100 ml. beaker to be equivalent to 0.25 gram total weight of platinum plus rhodium. The H–151 alumina-silica was then immersed in the solution and the combined solid-liquid mixture was heated to 60° C. Five grams of a 37% formaldehyde solution was slowly added, over a period of five minutes, to the solid-liquid mixture which was being agitated mechanically so that uniform mixing of the liquids and uniform contact of liquid with the spheres was obtained. The precious metals were precipitated in and on the H–151 spheres but some remained in suspension in the liquid phase. After one hour, the liquid was drained from the spheres and then the spheres were dried in air at 150° C. for four hours. The catalyst produced was evaluated with the results being shown as Example A in the table which follows. The catalyst was sectioned and a photograph thereof showed that the penetration was excessive, explaining the low catalytic activity.

EXAMPLE B

*Improved Catalyst Preparation*

Fifty grams of H–151 support was heated to 200° C. for two hours and then was immediately immersed in the precious metals solution (weight ratio of platinum: rhodium, 80:20) as described in Example A except that the initial temperature was 50° C. The spheres were agitated for 10 minutes in the solution. They were then removed and excess liquid was drained therefrom. The quantity of liquid retained by the spheres, was just sufficient to yield 0.5% precious metals relative to the dry weight of the granules. The moist spheres were then placed in a horizontal glass tube which was placed in a furnace capable of heating the tube and contents to 250° C. The tube was fitted with connections at each end which permitted gas to enter at one end and exhaust at the other. A stream of a mixture of hydrogen-nitrogen in a ratio of 1 to 2 was first humidified with water equal to saturation at 20° C. then was passed over the impregnated spheres at 55° C. (initial R.H., 15%) until they turned uniformly black. The temperature was subsequently raised to 200° C. then the catalyst was cooled for evaluation. A photograph of a cross section of the granule showed that the active metals were concentrated uniformly on the exterior of the spheres and no precious metal remained in the interior. The activity, as tabulated in the table was high. Furthermore, it was discovered that by varying the reduction temperature and humidity, the active metals could be located at the surface in a predetermined manner, and it was also found that the most active catalysts were prepared with low initial reduction temperature (25° C. to 75° C.), and with the precious metals (platinum, palladium and rhodium) confined to a depth of not more than 0.2 to 0.5 mm.

EXAMPLE C

*Improved Catalyst Preparation*

The same procedure was employed for other supports, for example, alumina-silica having 0.1% silica, made by Houdry Process Corporation and designated 200-S hard alumina support. It was effective in producing uniformly active catalyst, with the active catalytic metal concentrated uniformly on the exterior of the support.

The testing of the catalysts of the foregoing examples was performed by passing a slight stoichiometric excess of hydrogen with a mixture of oxides of nitrogen (NO, $NO_2$ and $N_2$) over the catalyst at 25° C., and permitting the catalyst to reach the maximum temperature (ca. 700° C. when the light-off occurred at 25° C.) which was attained autothermally. The space velocity (cc. gas, N.T.P., per cc. catalyst per hour) was 100,000.

TABLE

*Comparison of Catalyst Activities in Fume Abatement Pilot Test*

| Catalyst Preparation | Type Support | Light-Off at 25° C. | P.p.m. $O_2$ or Nitrogen Oxides Leakage |
|---|---|---|---|
| Example A (Control) | Alcoa H–151 | Not satisfactory | >550 |
| Example B | Alcoa H–151 | Satisfactory | <50 |
| Example C | Houdry 200–S | do | <50 |

EXAMPLE D

One hundred grams of activated 4 to 8 mesh carbon of the type designated SJ by the National Carbon Company was immersed in 500 ml. of 2% aqueous palladium chloride solution at 50° C. The carbon had a surface area of 825 square meters per gram and more than 63% of the pores were less than 200 A. and 70% were smaller than 1000 A. in diameter, pore size being measured by the method described below. The granules were agitated for 5 minutes, then the excess solution was drained from the carbon granules. The quantity of liquid retained by the carbon was such that 0.20% palladium relative to the dry weight of the granules was retained by them.

The moist granules were then placed in a horizontal glass tube which was placed in a furnace capable of heating the tube and contents to 250° C. The tube was fitted with connections at each end which permitted gas to enter at one end and to exhaust at the other. A thermocouple well extended lengthwise through the tube so that the temperature in the catalyst bed could be determined. A stream of a mixture of hydrogen in nitrogen in a ratio of 1 to 4 was first humidified with water at 30° C. then was passed over the impregnated granules at 65° C. (relative humidity 16%) until a total of 10 liters of $H_2$ had passed over the granules. The temperature was subsequently raised to 200° C. then the catalyst was cooled for evaluation. The location of the palladium was determined by an abrasive test in which 25 grams of the granules were shaken on a 20 mesh Rotap screen for a period of time necessary to abrade away sufficient of the exterior of the granules to be equivalent to 20% of their total weight. In these tests more than 80% of the total palladium content of the granules was contained in the material abraded from the surface.

The activity and life of the catalyst prepared by this procedure was exceptionally uniform and high as shown in the tabulation subsequently given. Additionally, it was discovered that by varying the reduction temperature and humidity, the palladium could be located at the surface in a predetermined manner, and it was also found that the most active catalysts were prepared with low initial reduction temperatures (25° to 75° C.) and with the precious metals largely confined to a depth of not more than 0.2 to 0.5 mm.

*Comparison of Catalyst Prepared by Method of Example D and Example A Hydrogenation of Dicyanobutene to Dicyanobutane*

| Catalyst No. | Prep. Method | Comparative Activity* | Life Index* |
| --- | --- | --- | --- |
| 1 | Ex. A | 25 | 10 |
| 2 | Ex. A | 100 | 100 |
| 3 | Ex. A | 67 | 60 |
| 4 | Ex. A | 72 | 75 |
| 5 | Ex. D | 95 | 94 |
| 6 | Ex. D | 100 | 100 |
| 7 | Ex. D | 98 | 101 |

*Hereinafter defined.

It is evident that the preparation method of Example D is much superior to the procedure of Example A which is the customary method of prior art.

EXAMPLE E

Two hundred grams of 3 to 6 mesh activated alumina of the type designated F-10 by Aluminum Company of America was immersed in 500 ml. of 5% platinum chloride solution at 60° C. The granules were agitated for 10 minutes, then the excess solution was drained from the granules. The quantity of liquid retained by the granules was such that 0.15% platinum relative to the dry weight of the granules was retained by them. The activated alumina had a surface area of 100 square meters per gram and more than 50% of the pores were less than 200 A. and 67% were smaller than 1000 A. in diameter.

The moist granules were then placed in a horizontal glass tube which was placed in a furnace capable of heating the tube and contents to 250° C. The contents were then reduced in exactly the same way as described in Example D except that a total of 20 liters of hydrogen, instead of 10, was passed over the catalyst.

This catalyst was also exceptionally active and uniform when compared with catalyst prepared by Example A and when both were used for hydrogenation or oxidation reactions.

EXAMPLE F

Two hundred grams of a tabular alumina (designated T-71 by the Aluminum Company of America) was immersed in a 5% aqueous solution of platinum chloride at 60° C. The alumina had a surface area of 0.55 square meter per gram and 100% of the pores were greater than 1000 A. in diameter. The granules were agitated for ten minutes, then the excess solution was drained from the granules. The quantity of platinum chloride solution retained by the granules was such that 0.15% platinum relative to the dry weight of the granules was retained by them.

The moist granules were reduced at 60° C. using a 1:4 mixture of $H_2$ in $N_2$ containing water vapor equivalent to 18% relative humidity at 60° C. The catalyst was given a final reduction at 200° C. for one hour.

The catalyst was set aside for evaluation as subsequently described.

EXAMPLE G

One hundred grams of ¼-inch spinel spheres (of the type designated LMA703 and manufactured by the Norton Company) were immersed in a 5% aqueous solution of platinum chloride at 50° C. The spheres had a surface area of 2.8 square meters per gram and 97% of the pores were larger than 1000 A. and only 0.9% smaller than 200 A. The spheres were agitated for 5 minutes then the excess solution was drained off. The quantity of liquid retained by the spheres was sufficient to be equivalent to 0.15% platinum based on the dry weight of the spheres.

The moist, impregnated spheres were reduced by the procedure described for Example E and were then set aside for evaluation as described below.

EXAMPLE H

Two hundred grams of ¼-inch silica-alumina spheres (of the type designated LA623 and manufactured by Norton Company) were immersed in a 5% aqueous solution of platinum chloride at 50° C. The spheres had a surface area of 6.5 square meters per gram and 19% of the pores were smaller than 100 A. and 3.9% were smaller than 200 A. in diameter. The spheres were agitated for 5 minutes, then the excess solution was drained off. The quantity of liquid retained by the spheres was sufficient to be equivalent to 0.15% platinum based on the dry weight of the spheres.

The moist impregnated spheres were reduced by the procedure described for Example E and were then set aside for evaluation as described below.

EXAMPLE I

Two hundred grams of ¼-inch silica-alumina spheres (of the type designated LA622 and manufactured by Norton Company) were immersed in a 5% aqueous solution of platinum chloride at 50° C. The spheres had a surface area of 28.8 square meters per gram and 37% of the pores were smaller than 1000 A. and 14.6% were smaller than 200 A. The spheres were agitated for 5 minutes, then the excess solution was drained off. The quantity of liquid retained by the spheres was sufficient to be equivalent to 0.15% platinum based on the dry weight of the spheres.

The moist impregnated spheres were reduced by the procedure described for Example E and were then set aside for evaluation as described below.

EXAMPLE J

Two hundred grams of ¼-inch silica-alumina spheres (of the type designated LA617 and manufactured by Norton Company) were immersed in a 5% aqueous solution of platinum chloride at 50° C. The spheres had a surface area of 56.0 square meters per gram and 39.0% of the pores were smaller than 1000 A. and 23.9% were smaller than 200 A. The spheres were agitated for 5 minutes, then the excess solution was drained off. The quantity of liquid retained by the spheres was sufficient to be equivalent to 0.15% platinum based on the dry weight of the spheres. The moist impregnated spheres were reduced by the procedure described for Example E, and were then set aside for evaluation as described below.

EXAMPLE K

The catalyst supports of Examples D, E, F, G, H, I, and J were also impregnated and activated by the procedure described in Example A. The finished catalysts thus prepared were compared in typical uses with catalysts prepared according to the methods described for Examples D, E, F, G, H, I, and J. The results for two of the applications are tabulated below:

The moist granules were reduced at 79° C. using a 1:5 mixture of $H_2$ in $N_2$ containing water vapor equivalent to 44% relative humidity at 70° C. The catalyst was given a final reduction at 225° C. for one hour.

The catalyst was unusually effective for reactions in which CO and $H_2$ are converted to hydrocarbons and straight chain alcohols.

EXAMPLE N

Two hundred grams of a silica-alumina "cracking catalyst" having an added 0.1% $F_2$ to increase acidity, in the form of 16 to 30 mesh granules were hydrated to prevent

| Sample Description | Surface Area of Support, Sq. Meters/gram | Pore Size Characteristics | | Comparative Activity For— | |
|---|---|---|---|---|---|
| | | Percent <1,000 | Percent <200 | $O_2+H_2$ at 25° C. | $CNC_4H_6CN$ to $CNC_4H_8CN$ |
| Support of Example D Activated by Ex. A Procedure | 800 | 70 | 63 | | 66 (Ave.) |
| Support of Example D Activated by Ex. D Procedure | 800 | 70 | 63 | | 98 (Ave.) |
| Support of Example E Activated by Ex. A procedure | 110 | 67 | 50 | 60 | 60 |
| Support of Example E Activated by Ex. E Procedure | 110 | 67 | 50 | 100 | 97 |
| Support of Example F Activated by Ex. A Procedure | 0.55 | 0 | 0 | 35 | 43 |
| Support of Example F Activated by Ex. E Procedure | 0.55 | 0 | 0 | 36 | 41 |
| Support of Example G Activated by Ex. A Procedure | 2.8 | 3.0 | 0.9 | 46 | 45 |
| Support of Example G Activated by Ex. E Procedure | 2.8 | 3.0 | 0.9 | 47 | 44 |
| Support of Example H Activated by Ex. A Procedure | 6.5 | 19.0 | 3.9 | 51 | 49 |
| Support of Example H Activated by Ex. E Procedure | 6.5 | 19.0 | 3.9 | 66 | 64 |
| Support of Example I Activated by Ex. A procedure | 28.8 | 37.0 | 14.6 | 53 | 56 |
| Support of Example I Activated by Ex. E Procedure | 28.8 | 37.0 | 14.6 | 97 | 100 |
| Support of Example J Activated by Ex. A Procedure | 56.0 | 39.0 | 23.9 | 54 | 57 |
| Support of Example J Activated by Ex. E Procedure | 56.0 | 39.0 | 23.9 | 100 | 100 |

EXAMPLE L

Two hundred grams of 4 to 8 mesh activated alumina (of the type designated F10 by Aluminum Company of America) were immersed in a 1% barium nitrate solution at 90° C. The activated alumina had the same pore characteristics as that employed in Example E. After 5 minutes exposure, the excess solution was drained away, then the granules were heated to 400° C. for three hours to convert the barium nitrate to a thin film of barium oxide throughout the support.

The support with barium oxide was then immersed in a 15% silver nitrate solution at 50° C., then the excess solution was drained away after a 10 minute exposure. The moist granules were placed in the reducer of Example E and a mixture of 1 part $H_2$ and 4 parts nitrogen was humidified with water, then was passed over the granules at 75° C. for 90 minutes then finally for 30 minutes at 250° C. The relative humidity of the hydrogen-nitrogen mixture was 38% at 75° C. The total quantity of hydrogen passed over the granules was 20 liters. The reduced catalyst contained 0.5% BaO and 2.8% Ag and was exceptionally efficient for the selective oxidation of ethylene to ethylene oxide.

EXAMPLE M

Two hundred grams of alumina-silica support (Houdry 200S) in the form of 8 to 12 mesh granules were immersed in a 5% aqueous solution of ruthenium chloride at 35° C. The granules had a surface area of 190 square meters per gram and more than 60% of the pores were less than 200 A. and 79% of the pores were less than 1000 A. in diameter. The quantity of liquid retained by the granules was such that 0.22% ruthenium relative to the dry weight of the granules was retained by them.

spalling then were immersed in an aqueous solution comprising 3% palladium and 3% ruthenium chlorides. The surface area of the support was 360 square meters per gram and more than 73% of the pores were less than 200 A. and 93% were less than 1000 A. in diameter. The quantity of liquid retained by the granules was such that 0.09% palladium and 0.10% ruthenium relative to the dry weight of the support was retained.

The moist granules were reduced at 60° C. using a 1:4 mixture of $H_2$ in $N_2$ containing water vapor equivalent to 18% relative humidity at 60° C. The catalyst was similarly given a final reduction at 180° C. for 90 minutes.

The catalyst thus described was especially effective for dehydrocyclization reactions such as the conversion of heptane to toluene.

It is to be understood that the foregoing examples are illustrative only and that numerous embodiments of the invention will occur to those who are skilled in this art. For example, the reducing agent employed in the gas phase reduction of the salt can be methanol vapor, formaldehyde vapor, etc. In Example A, which represents the best of the prior art methods, it is to be understood that catalyst of high light-off temperature is not invariably obtained. In a certain percentage of trials, exceptionally excellent catalyst, capable of lighting off very satisfactorily at 25° C., is obtained by this prior art liquid phase reduction process. At least about fifty percent of the time, however, the catalyst fails to meet the pilot test described above, which is a measure of the catalyst activity. On the other hand, the process of the present invention invariably yields catalyst of high enough activity to meet this pilot test.

Figure 2:
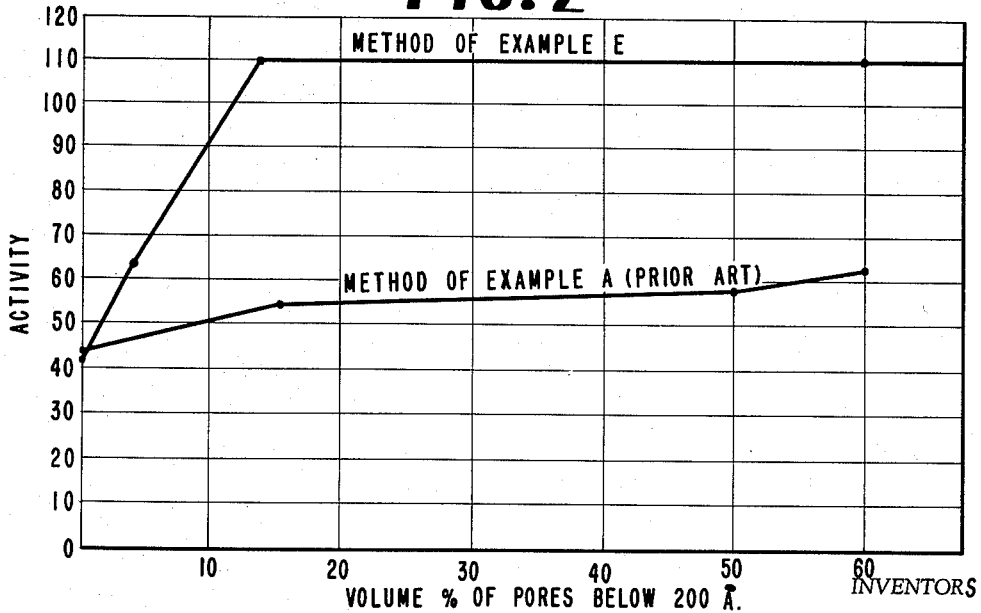

FIGURES 1 and 2 of the drawing provide a comparison of the activity of the new catalysts with those made by the methods of the prior art. It is apparent from the tabulation and from the curves of FIGURES 1 and 2 that the method of impregnation of a support pore size such that more than 1% is less than 200 A. and more than 10% less than 1000 A. is best accomplished by the procedure described in Example E. Inasmuch as the procedure of Example E permits a control of the location of the precious metal, it permits a more effective and efficient use of the precious metals at a location where diffusion to the active catalytic metal is possible. In the procedure of Example A, the active metals are located randomly throughout the support where much is not available to the reaction substrates.

It is apparent also that when the pores are large, more than 91% greater than 1000 A. and 99% greater than 200 A., for example, there is little difference in activity of the catalysts prepared by the procedures of Examples A and E. This is probably attributable to the fact that diffusion to the active metal is relatively easy through the large pores so that ability to locate the metal near the surface is not as important as when there is adequate numbers of small pores.

The fact that the support having essentially all large pores (surface area is low) produces a catalyst having low activity is attributable to the fact that the precious metal is many atoms deep and consequently the bulk of the metal is not available for functioning as a catalyst.

Pore volume measurements reported in the foregoing Examples D to N inclusive, were made in Aminco-Winslow Porosimiter Model No. 5–7108 manufactured by American Instrument Company of Silver Spring, Maryland.

The test for "Comparative Activity" was made by passing a hydrogen gas stream containing 1% dicyanobutene through a bed of the catalyst to be examined at 300° C. and a fixed space velocity.

Comparative activity=

$$\frac{100 \times \text{moles dicyanobutane in effluent}}{\text{moles dicyanobutene in feed}}$$

The test for "Life Index" was made by continuing the comparative Activity Test for 24 or more hours then making an Activity determination. The Life Index was expressed by the following:

Life index=

$$\frac{100 \times \text{comparative activity at 23 to 24 hr. period}}{\text{comparative activity at 0 to 1 hour period}}$$

This application is a continuation-in-part of our copending application Serial No. 673,561, filed July 23, 1957, now abandoned.

We claim:

1. A method for preparing a catalyst which comprises bringing an aqueous solution of an ionizable salt of an element of the class consisting of platinum, rhodium, palladium, ruthenium and silver, said salt being a member of the class consisting of chlorides and nitrates, into contact with a silica-gamma alumina support, whereby 0.1% to 5.0% by weight of said element is incorporated in said support, the quantity of the said silica being from 0.05% to 15% of the weight of said gamma alumina, subjecting the resultant undried solid to the action of a reducing gas at a controlled humidity at a temperature initially above 0°, and below 100° C., said humidity being 15% to 90% R.H., whereby the said element is reduced to metal, while said ionizable salt is migrating to the surface of the solid support, said temperature and humidity being so balanced against each other that the rate of migration of the said salt to the surface is not so rapid as to cause accumuation of unreduced salt at the surface as evidenced by the formation of a metal coating which can be sloughed off by abrasion, and continuing said reduction until all of the element is reduced and converted to a coating of said metal on the outer surface of said support.

2. The method of claim 1 wherein said element is platinum.

3. The method of claim 1 wherein a plurality of said elements is employed.

4. The method of claim 3 wherein said elements are platinum and rhodium.

5. The method of claim 4 wherein the said elements comprise 80% by weight of platinum and 20% by weight of rhodium.

6. The method for preparing a catalyst which comprises bringing an aqueous solution of at least one ionizable salt of at least one metal of the class consisting of platinum, rhodium, palladium, ruthenium, and of silver, said salt being a member of the class consisting of chlorides and nitrates, into contact with a silica-gamma alumina support having more than 1% of its pores with a diameter less than 200 A. and more than 10% of its pores less than 1000 A. in diameter, whereby 0.5% to 15% by weight of said metal in said solution, based on the weight of the support, is incorporated in said support, subjecting the resultant undried solid to the action of a reducing gas at a temperature initially above 0° and below 100° C., the humidity of said gas being 15% to 90% R.H., whereby reduction of said salt to metal occurs while ionizable salt is migrating to the surface of the support, said temperature and humidity being so balanced against each other that the rate of migration of the said salt to the surface is not as rapid as to cause accumulation of unreduced salt at the surface which can be sloughed off by high abrasion, and continuing said reduction until all of the element is reduced and converted to a coating of said metal on the outer surface of said support.

References Cited in the file of this patent

UNITED STATES PATENTS

| | | |
|---|---|---|
| 2,611,749 | Haensel | Sept. 23, 1952 |
| 2,759,897 | Haensel et al. | Aug. 21, 1956 |